(12) United States Patent
Kim

(10) Patent No.: US 10,508,762 B2
(45) Date of Patent: Dec. 17, 2019

(54) ASSEMBLY OF A FLEXIBLE TUBE AND A FITTING BODY AND A METHOD THEREOF

(71) Applicant: Brian B. Kim, Denton, TX (US)

(72) Inventor: Brian B. Kim, Denton, TX (US)

(73) Assignee: Brian B. Kim, Denton, TX (US)

( * ) Notice: Subject to any disclaimer, the term of this patent is extended or adjusted under 35 U.S.C. 154(b) by 178 days.

(21) Appl. No.: 15/463,610

(22) Filed: Mar. 20, 2017

(65) Prior Publication Data

US 2018/0266598 A1 Sep. 20, 2018

(51) Int. Cl.
*F16L 33/22* (2006.01)
*F16L 19/065* (2006.01)

(52) U.S. Cl.
CPC .......... *F16L 33/224* (2013.01); *F16L 19/065* (2013.01)

(58) Field of Classification Search
CPC ......... F16L 19/08; F16L 19/10; F16L 19/103; F16L 33/22; F16L 33/222; F16L 33/223; F16L 33/224
USPC ....... 285/331, 247, 256, 354, 382.7
See application file for complete search history.

(56) References Cited

U.S. PATENT DOCUMENTS

| | | | | |
|---|---|---|---|---|
| 2,179,200 A * | 11/1939 | Scholtes | ............... | F16L 33/222 285/250 |
| 2,470,538 A * | 5/1949 | Wolfram | ............... | F16L 33/222 285/249 |
| 2,513,115 A * | 6/1950 | Sprigg | .................. | F16L 33/224 285/249 |
| 2,516,583 A * | 7/1950 | Moore | .................. | F16L 33/224 285/114 |
| 2,787,480 A * | 4/1957 | Staller | ..................... | F16L 33/22 285/148.13 |
| 2,935,339 A * | 5/1960 | Frederick | .............. | F16L 33/224 285/4 |
| 3,025,086 A * | 3/1962 | Mosely | ................... | F16L 47/04 285/250 |
| 3,306,637 A * | 2/1967 | Press | ...................... | F16L 33/01 285/222.1 |
| 3,591,208 A * | 7/1971 | Nicolaus | ............... | F16L 19/086 285/250 |
| 3,615,160 A * | 10/1971 | Feather | ................ | F16L 33/224 285/250 |
| 3,700,268 A * | 10/1972 | Nielsen, Jr. | .......... | F16L 33/224 285/249 |
| 4,062,572 A * | 12/1977 | Davis | ..................... | F16L 19/08 285/249 |
| 4,256,335 A * | 3/1981 | Nielsen, Jr. | .......... | F16L 33/222 285/250 |
| 4,482,170 A * | 11/1984 | Jacobson | .............. | F16L 33/221 285/105 |

(Continued)

*Primary Examiner* — Aaron M Dunwoody
(74) *Attorney, Agent, or Firm* — Sul Lee

(57) ABSTRACT

The present disclosure provides an apparatus and method assembling a flexible tube and a fitting body. A combination collet, a second collet, and a compression nut are introduced to an outer surface of a flexible tube. A first end of the flexible tube is introduced to a shoulder of the fitting body such that at least a portion of the flexible tube is inside the shoulder of the fitting body. The compression nut is fastened onto a threaded portion of the fitting body such that a plurality of radial pressure caused by the compression nut causes the combination collet and the second collet to clamp down on the outer surface of the flexible tube.

12 Claims, 6 Drawing Sheets

(56) References Cited

U.S. PATENT DOCUMENTS

| | | | | |
|---|---|---|---|---|
| 4,848,802 | A * | 7/1989 | Wolf | F16L 19/086 285/39 |
| 4,906,030 | A * | 3/1990 | Yokomatsu | F16L 33/16 285/101 |
| 5,121,949 | A * | 6/1992 | Reese | F16L 47/04 285/255 |
| 6,378,915 | B1 * | 4/2002 | Katz | F16L 19/086 277/604 |
| 8,007,013 | B2 * | 8/2011 | Arstein | F16L 19/061 285/342 |
| 8,746,752 | B2 * | 6/2014 | Hayashi | F16L 41/021 285/247 |
| 10,006,570 | B2 * | 6/2018 | Yoda | F16L 19/061 |
| 2003/0085575 | A1 * | 5/2003 | Crestin | H01R 13/59 285/382.7 |
| 2005/0035597 | A1 * | 2/2005 | Bamberger | F16L 37/091 285/340 |
| 2008/0231041 | A1 * | 9/2008 | Bucchi | F16L 33/224 285/32 |
| 2009/0224536 | A1 * | 9/2009 | Fukushima | F16L 19/02 285/327 |
| 2010/0156095 | A1 * | 6/2010 | Inoue | F16L 33/224 285/249 |
| 2011/0042943 | A1 * | 2/2011 | Gershkovich | A61M 5/16831 285/308 |
| 2012/0038150 | A1 * | 2/2012 | Williams | F16L 19/10 285/342 |
| 2012/0299296 | A1 * | 11/2012 | Lombardi, III | F16L 33/223 285/389 |
| 2018/0283586 | A1 * | 10/2018 | Larson | F16L 19/12 |

* cited by examiner

ASSEMBLY OF A FLEXIBLE TUBE AND A FITTING BODY AND A METHOD THEREOF

TECHNICAL FIELD

The present disclosure relates generally to flexible tube fittings in gas and plumbing and more specifically to an assembly of a flexible tube and a fitting body and a method thereof.

BACKGROUND ART

A flexible tube in gas and plumbing may be assembled with a valve in order to receive or supply a fluid or gas to the valve or fitting or may be assembled with another tube to provide an extension in overall length of the gas supply or plumbing. A typical method of making such an assembly involves assembling the flexible tube with a fitting body using a flexible tube connector arrangement and then assembling the assembly of the tube and the fitting body to the valve or another assembly of another tube and the fitting body. The flexible tube connector arrangement may include a hose band screw, or a hose coupling using a guide ring and a compression nut or a one touch nipple hose connection etc. Such an assembly is rather easy to achieve for low pressure applications as only minimal outer surface area of the flexible tube has to be compressed.

In applications involving relatively high pressures a larger portion of the outer surface area of the flexible tube needs to be compressed. Further, a large amount of force is required to compress the larger portion under, for example, a clamp. Thus it may be necessary that a pneumatic or hydraulic device be used. Further, a size of the larger portion is determined during the design phase and during the assembly of the flexible tube and the fitting body, as adhering to the size of the larger portion is imperative for a proper assembly. This poses a challenge if the assembly of the flexible tube and the fitting body has to be achieved in field or at a large scale, for example, in production line.

In light of the discussion above, there is clearly a need for an improved tube connector arrangement and a method for assembling a flexible tube that overcomes one or more of the above mentioned deficiencies.

SUMMARY

According to a first aspect of the present disclosure, there is provided an apparatus for adjoining a flexible tube with a fitting body. The apparatus includes a fitting body comprising a threaded portion on an outer surface and a shoulder at an end of the threaded portion extending away from the fitting body; a guide tube extending from the fitting body coaxially in the same direction as the shoulder of the fitting body; a flexible tube coaxially engaged with the guide tube and comprising an outer surface; and a sealing assembly arrangement coaxially over the flexible tube and engaged with the fitting body, the sealing assembly arrangement configured to clamp down against the outer surface of the flexible tube at multiple locations due to radial pressure.

In an embodiment, the sealing assembly arrangement comprises a compression nut comprising an inner threaded portion configured to engage with the threaded portion of the fitting body, a first taper portion, and a second taper portion.

In an embodiment, the sealing assembly arrangement further comprises a combination collet configured to clamp down at a first location and a second location on the outer surface of the flexible tube due to radial pressure caused by the compression nut being moved toward the fitting body.

In an embodiment, the combination collet comprises a ferrule configured to engage with the shoulder of the fitting body and clamp down at the first location of the outer surface of the flexible tube due to radial pressure between the ferrule and the shoulder of the fitting body caused by the compression nut being moved toward the fitting body; and a first collet comprising a first clamping portion, the first collet configured to clamp down at the second location of the outer surface of the flexible tube due to radial pressure between the first taper portion and the first clamping portion caused by the compression nut being moved toward the fitting body.

In an embodiment, the sealing assembly arrangement further comprises a second collet comprising a second clamping portion, the second collet configured to clamp down at a third location on the outer surface of the flexible tube due to radial pressure between the second taper portion and the second clamping portion caused by the compression nut being moved toward the fitting body.

In an embodiment, the fitting body comprises the guide tube, the guide tube extending out from the fitting body in the same direction as the shoulder.

In an embodiment, the guide tube comprises a rigid tube that is coaxially positioned through the fitting body such that a first end of the rigid tube extends from one side of the fitting body and a second end of the rigid tube extends from the opposite side of the fitting body.

According to another aspect of the present disclosure, there is provided a method for adjoining a flexible tube with a fitting body. The method comprises: introducing a combination collet, a second collet, and a compression nut to an outer surface of a flexible tube; introducing a first end of the flexible tube to a shoulder of the fitting body such that at least a portion of the flexible tube is inside the shoulder of the fitting body; and fastening the compression nut onto a threaded portion of the fitting body such that a plurality of radial pressure caused by the compression nut causes the combination collet and the second collet to clamp down on the outer surface of the flexible tube.

In an embodiment, fastening the compression nut onto the threaded portion of the fitting body comprises causing a first radial pressure by pressing a first taper portion of an inner wall of the compression nut against a first clamping portion of the combination collet.

In an embodiment, fastening the compression nut onto the threaded portion of the fitting body further comprises: causing a second radial pressure by pressing a second taper portion of an inner wall of the compression nut against a second clamping portion of the second collet.

In an embodiment, fastening the compression nut onto the threaded portion of the fitting body further comprises: causing a third radial pressure by pressing a ferrule of the combination collet against the shoulder of the fitting body.

In an embodiment, the first radial pressure is caused before the second radial pressure is caused.

In an embodiment, the first radial pressure and the second radial pressure are caused simultaneously.

BRIEF DESCRIPTION OF THE ACCOMPANYING DRAWINGS

So that the manner in which the above recited features of the present disclosure can be understood in detail, a more particular description of the disclosure, briefly summarized above, may have been referred by embodiments, some of which are illustrated in the appended drawings. It is to be noted, however, that the appended drawing illustrate only typical embodiments of this disclosure and are therefore not to be considered limiting of its scope, for the disclosure may admit to other equally effective embodiments.

These and other features, benefits, and advantages of the present disclosure will become apparent by reference to the following text figure, with like reference numbers referring to like structures across the views, wherein.

DEFINITIONS OF TERMS

Figure 1:
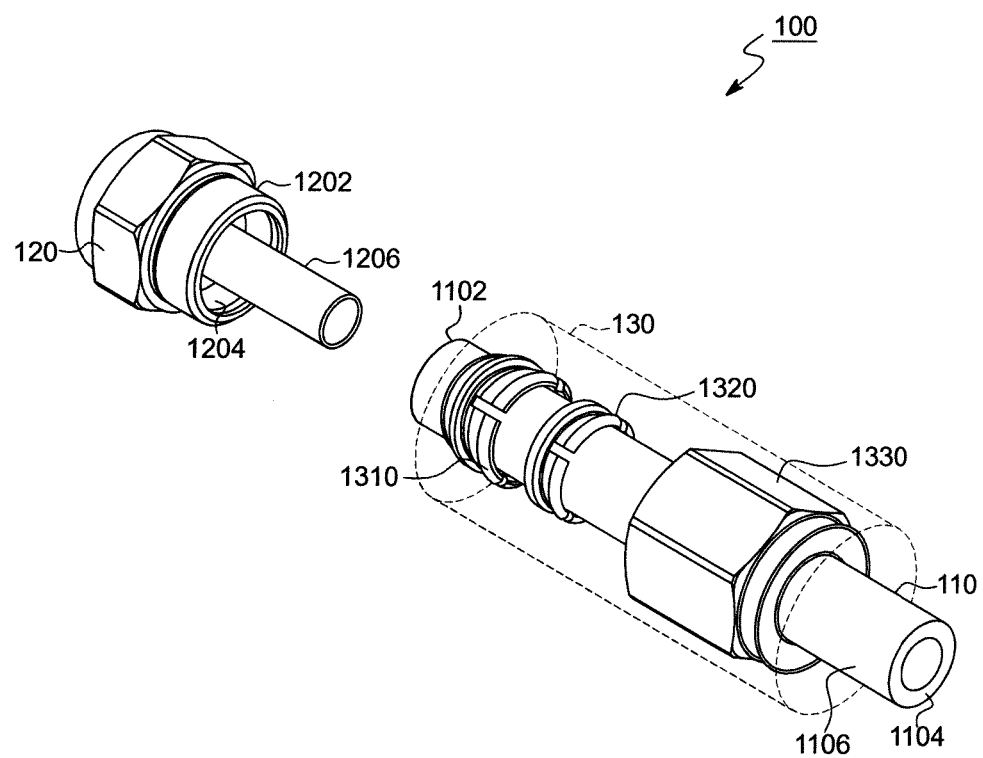
FIG. 1 illustrates an exploded view of an assembly of a flexible tube and a fitting body, in accordance with an embodiment of the present disclosure.

The following definitions are provided as general definitions and should in no way limit the scope of the present disclosure to those terms alone, but are put forth for a better understanding of the following description.

Unless defined otherwise, all technical and scientific terms used herein have the same meaning as commonly understood by those of ordinary skill in the art to which the disclosure belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present disclosure, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present disclosure, the following terms are defined below.

In the context of the specification, a "polymeric material" is any naturally occurring or man-made material having long chains of organic molecules (eight or more organic molecules), with physical and chemical properties of such organic molecules giving the material its desired properties.

In the context of the specification, a "flexible tube" is a hollow conduit meant for supply of fluids. The flexible tube may be made up of, but not limited to, any suitable polymeric material or a composite material. The flexible tube is flexible by virtue of being able to be flexed or bent under force, in a number ways, without imparting any irreversible or plastic deformation or fracture to the flexible tube.

In the context of the specification, a "fitting body" is a hollow body member made up of metal, polymer material or a composite material. The fitting may have fastening arrangements such as threads at its two ends. Fastening arrangements allow the fitting body to act as an interface while connecting the flexible tube to another component such as a service valve or another tube in the plumbing or gas supply. According to an embodiment, the fastening arrangements of the fitting body may have a predetermined length to correspond to a particular tube connector assembly.

In the context of the specification, a "ferrule" is adapted to be provided coaxially at an outer tube surface of the tube. According to an embodiment, the ferrule may have a substantially conical shape and/or a substantially conical portion. In an embodiment the ferrule may have a substantially cylindrical shape with a tapered portion. Under compression, the ferrule may engage with an outer surface of a flexible tube to provide a leak proof sealing between the flexible tube and the fitting body, while assembling the flexible tube with the fitting body.

In the context of the specification, a "collet" is a type of a chuck that forms a collar around an object to be held and exerts a strong clamping force on the object to be held when it is tightened. In one embodiment, the collet comprises a flange portion and a clamping portion having a conical outer surface that flares out away from the flange portion. According to an embodiment, the collet has a substantially cylindrical inner surface throughout the length of the collet. In another embodiment, the diameter of the inner surface at one lateral end with the flange portion is substantially the same as the diameter of the inner surface at the opposite (flared) end of the collet with the clamping portion. The clamping portion comprises a band (or sleeve) made up of one or more segments divided by one or more kerf cuts along its lateral length. In an embodiment, the collet may be tightened by being squeezed against a matching taper around the conical outer surface such that the inner surface contracts to a smaller diameter, clamping around the object to be held. According to an embodiment, the collet may be comprised of an elastic material that is metallic, polymeric, or composite. According to an embodiment, when pressure is applied to the outer surface of the collet's clamping portion, the one or more segments (defined by) contract to grip the outer surface of the flexible tube, whereas when the pressure is released, the plurality of segments substantially retain their original shapes, thereby releasing the outer flexible tube surface.

In the context of the specification, a "compression nut" is a nut with an inner diameter being slightly greater than largest diameter of the first collet and the second collet. The compression nut is provided with threads on inner surface of the compression nut. The threads allow the nut to be fastened to the fitting body in order to compress the ferrule, the first collet and the second collet for providing high pressure resistant assembly between the flexible tube and the fitting body.

DETAILED DESCRIPTION

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claim. As used throughout this description, the word "may" is used in a permissive sense (i.e. meaning having the potential to), rather than the mandatory sense, (i.e. meaning must). Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited in an open-ended manner, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present disclosure. It is not suggested or represented that any or all of these matters form part of the prior art base or were common general knowledge in the field relevant to the present disclosure.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present disclosure is described hereinafter by various embodiments with reference to the accompanying drawing, wherein reference numerals used in the accompanying drawing correspond to the like elements throughout the description. This disclosure may, however, be embodied in many different forms and should not be construed as limited to the embodiment set forth herein. Rather, the embodiment is provided so that this disclosure will be thorough and complete and will fully convey the scope of the disclosure to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the disclosure unless explicitly stated otherwise.

Referring to the drawings, the disclosure will now be described in more detail. FIG. 1 illustrates an exploded view of an assembly 100 that includes a flexible tube 110, a fitting body 120, and a sealing assembly arrangement 130, in accordance with an embodiment of the present disclosure. As shown in FIG. 1, the flexible tube 110 has a first flexible tube end 1102 and a second flexible tube end 1104. The fitting body 120 includes a threaded portion 1202 having threads on an outer surface of the threaded portion 1202. Further, the fitting body 120 includes a shoulder portion 1204 adapted for receiving the first flexible tube end 1102. In accordance with an embodiment of the present disclosure, the fitting body 120 further includes a guide tube portion 1206. When forming the assembly 100, the flexible tube is coaxially slid over the guide tube portion 1206 like a sleeve. The guide tube portion 1206 allows the fitting body 120 to act as an interface between the flexible tube 110 and a valve or another flexible tube. In accordance with various embodiments, the fitting body 120 may be made up of a metallic or a polymeric material.

Further, the sealing assembly arrangement 130 has been provided over an outer surface (or outer flexible tube surface) 1106 of the flexible tube 110. The sealing assembly arrangement 130 includes a combination collet 1310, a second collet 1320 and a compression nut 1330. In accordance with various embodiments, the combination collet 1310, the second collet 1320 and the compression nut 1330 may each be made up of metallic or polymeric materials.

Figure 3:
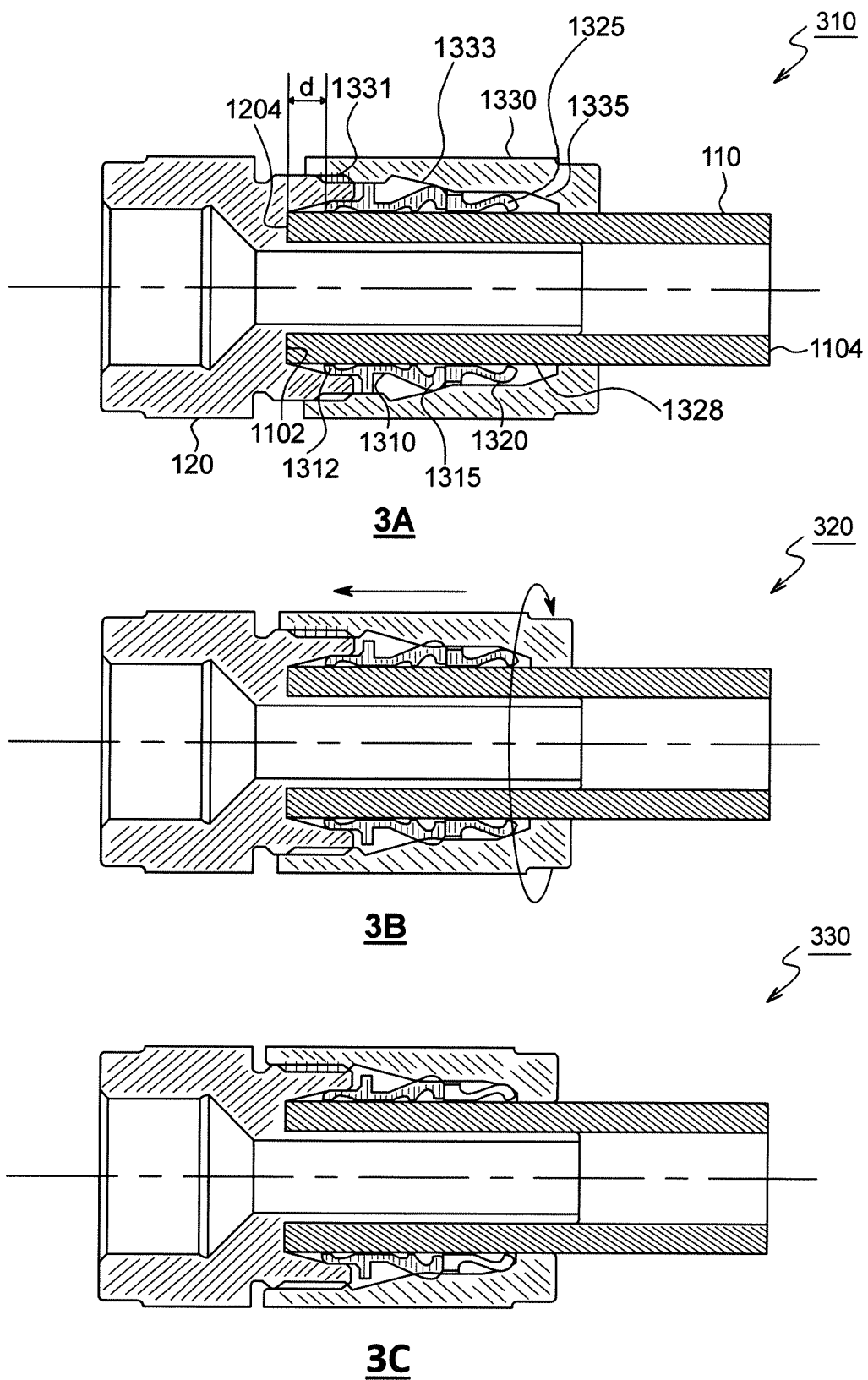
FIGS. 3A-3C illustrate a plurality of visual steps for assembling a flexible tube and a fitting body, in accordance with an embodiment of the present disclosure.

In accordance with an embodiment of the present disclosure, the compression nut 1330 includes threads on an inner surface of the compression nut 1330. When forming the assembly 100, the compression nut 1330 is adapted to be fastened onto the threaded portion 1202 of the fitting body 120. As illustrated in FIG. 3A, the compression nut 1330 comprises a hollow chamber in which the inner surface comprises a threaded portion 1331 with an initial inner diameter, a first taper portion 1333 after the threaded portion that narrows the inner diameter of the compression nut 1330 to a first narrow diameter, and a second taper portion 1335 after the first taper portion that narrows the inner diameter to a second narrow diameter. According to an embodiment, the first taper portion 1333 is adapted to apply radial pressure against the clamping portion 1315 of the first collet 1314 of the combination collet 1310 as the compression nut 1330 is rotated (as shown in FIG. 3B) to coaxially move the compression nut toward the fitting body 120. According to an embodiment, the second taper portion 1335 is adapted to apply radial pressure against the clamping portion 1325 of the second collet 1320 which has a smaller outer diameter than the first collet 1314 as the compression nut 1330 is rotated (as shown in FIG. 3C) to further coaxially move the compression nut toward the fitting body 120. In various embodiments, the compression nut may be further elongated and/or include one or more additional taper portions to accommodate putting radial pressure one or more corresponding collets with successively smaller outer diameters. According to an embodiment, the distance between the first taper portion 1333 and the second taper portion 1335 may be longer than the distance between an end of the threaded portion 1331 and the first taper portion 1333 such that the clamping portion 1315 of the first collet 1314 is radially compressed before the clamping portion 1325 of the second collet 1320 is radially compressed. According to another embodiment, the distance between the first taper portion 1333 and the second taper portion 1335 and the distance between an end of the threaded portion 1331 and the first taper portion 1333 are substantially the same such that the clamping portion 1315 of the first collet 1314 and the clamping portion 1325 of the second collet 1320 are radially compressed simultaneously.

Figure 2A:
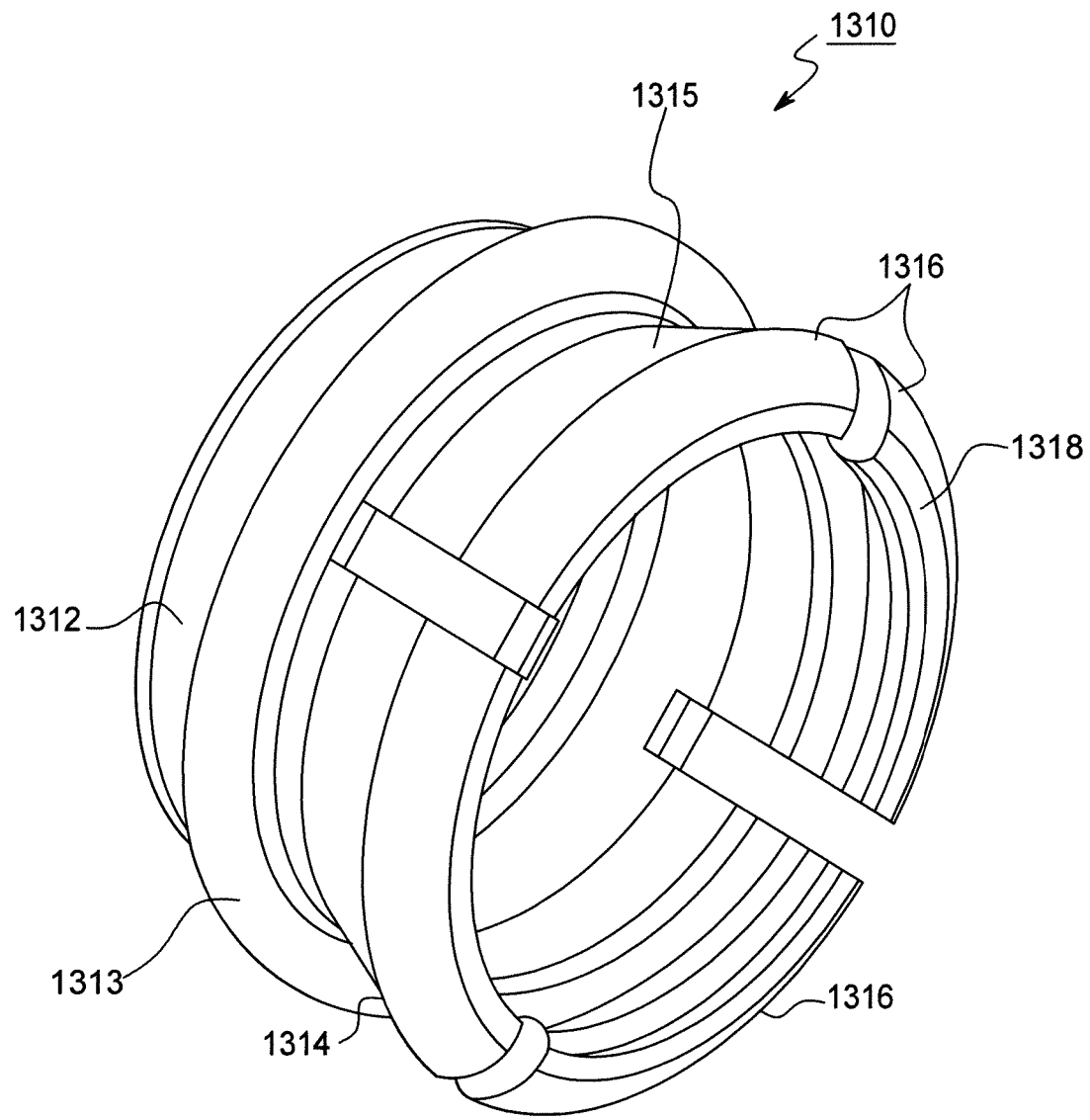
FIG. 2A illustrates a combination collet of a sealing assembly arrangement, in accordance with an embodiment of the present disclosure.

FIG. 2A illustrates the combination collet 1310 in accordance with an embodiment of the present disclosure. As shown in FIG. 2A, the combination collet 1310 includes a ferrule portion (or ferrule) 1312 and a first collet portion (or first collet) 1314 adjacent to the ferrule portion 1312. In accordance with an embodiment, the ferrule 1312 and the first collet 1314 have been manufactured as a single piece. In another embodiment, a ferrule 1312 and a first collet 1314 may be manufactured as separate pieces that together form the combination collet 1310 when forming the sealing assembly arrangement 130. The ferrule portion (or ferrule) 1312 is adapted to be compressed against the outer flexible tube surface 1106.

The first collet portion (or first collet) 1314 includes a flange portion 1313 and a clamping portion 1315 having a substantially cylindrical inner surface having a conical outer surface that flares out away from the flange portion. The clamping portion 1315 is in a form of a band (or sleeve) having one or more segments 1316 adapted to contract and grip the outer flexible tube surface 1106. In an embodiment, each of the one or more segments 1316 comprise a jaw (or dog) 1318 at the outer end for clamping (gripping) onto the outer flexible tube surface 1106. The one or more segments 1316 are defined (or separated) by kerf cuts along the lateral length of the one or more segments 1316. In an embodiment, the one or more segments 1316 are adapted to contract and fasten onto the outer surface 1106 of the flexible tube 110 when the conical outer surfaces of the flared out portions (or outer surfaces of the jaws 1318) of the one or more segments 1316 of the clamping portion 1315 are squeezed against a tapered inner surface (e.g. the first tapered inner surface 1333) of the compression nut 1330 such that an inner surface of the clamping portion 1315 (or inner surfaces of the jaws 1318) contracts to a smaller diameter. The combination collet 1310 serves the purpose of tightly gripping the flexible tube 110 with and helps to make the assembly 100 leak proof.

According to an embodiment, the combination collet 1310 may have a substantially cylindrical inner surface along the length of the combination collet 1310. According to an embodiment, the diameter of the inner surface of a first end of the combination collet 1310 (at the ferrule portion 1312) may be substantially similar to the diameter of the inner surface at the flange portion 1313 and the diameter of the inner surface at the second end of the combination collet 1310 (at the open end of the clamping portion 1316).

Figure 2B:
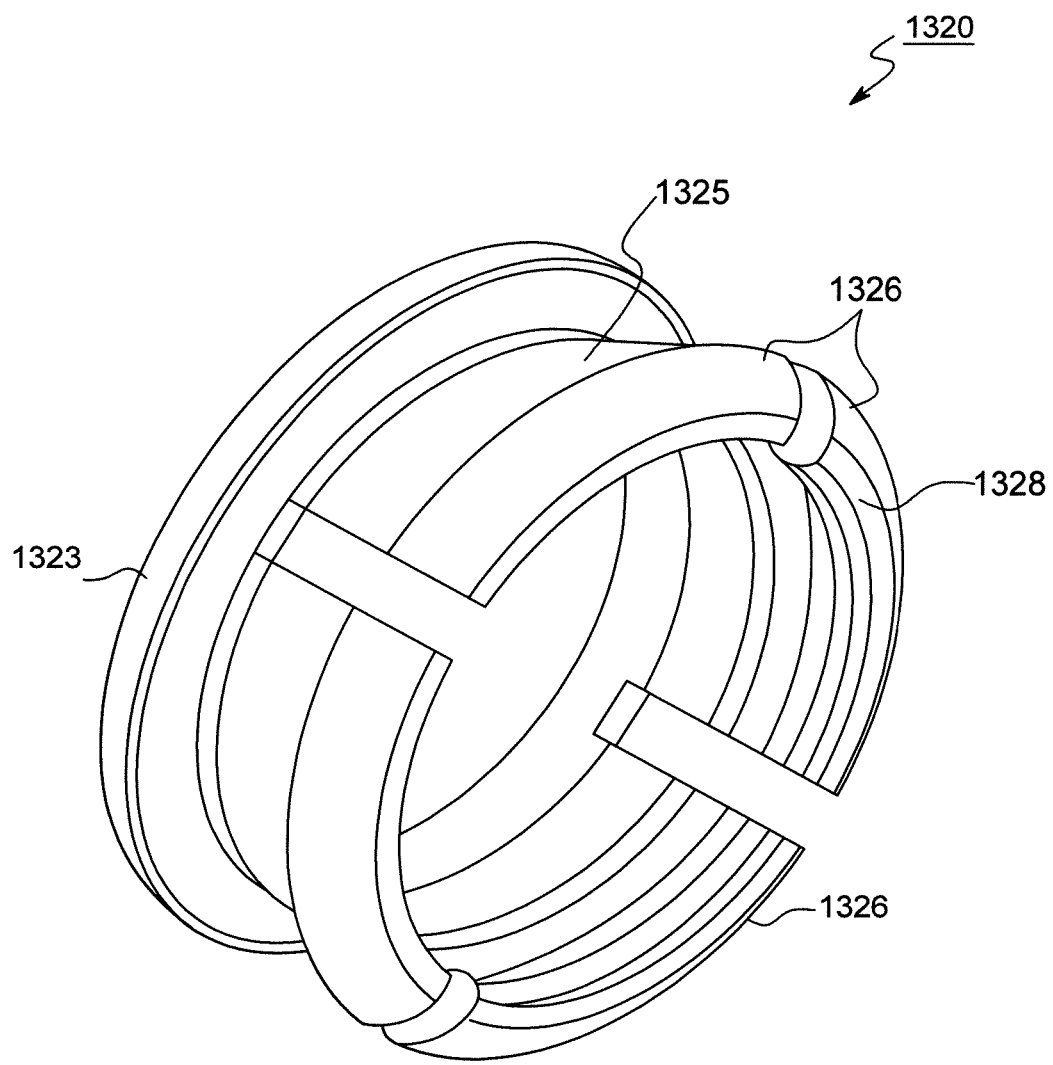
FIG. 2B illustrates a second collet of the sealing assembly arrangement, in accordance with an embodiment of the present disclosure.

FIG. 2B illustrates the second collet 1320 in accordance with an embodiment of the present disclosure. The second collet 1320 is in a form substantially similar to the first collet 1314. The second collet comprises a flange portion 1323 and a clamping portion 1325. According to an embodiment, the flange portion 1323 is adapted to abut the flared end of the combination collet 1310. The clamping portion 1325 is in a form of a band (or sleeve) having one or more segments 1326 adapted to contract and grip the outer flexible tube surface 1106. In an embodiment, each of the one or more segments 1326 comprise a jaw (or dog) 1328 at the outer end for clamping (gripping) onto the outer flexible tube surface 1106. The one or more segments 1326 are defined (or separated) by kerf cuts along the lateral length of the one or more segments 1326. In an embodiment, the one or more segments 1326 are adapted to contract and fasten onto the outer surface 1106 of the flexible tube 110 when the conical outer surfaces of the flared out portions (or outer surfaces of the jaws 1328) of the one or more segments 1326 of the clamping portion 1325 are squeezed against a tapered inner surface (e.g. the second tapered inner surface 1335) of the compression nut 1330 such that an inner surface of the clamping portion 1325 (or inner surfaces of the jaws 1328, collectively) contracts to a smaller diameter. According to an embodiment, the smallest inner diameter of the second collet 1320 may be substantially similar to the smallest inner diameter of the combination collet 1310. According to an embodiment, the outer diameter of the flange portion 1323 of the second collet 1320 is smaller than the outer diameter of the flange portion 1313 of the combination collet 1310, and the outer diameter of the end of the clamping portion 1325 (or jaws 1328) of the second collet 1320 is smaller than the outer diameter of the end of the clamping portion 1315 (or jaws 1318) of the combination collet 1310. In accordance with an embodiment of the present disclosure, the compression nut 1330 includes threads on an inner surface of the compression nut 1330.

As already discussed, the compression nut 1330 is adapted to be fastened onto the threaded portion 1202 of the fitting body 120. When forming the assembly 100, the fastening of the compression nut 1330 onto the threaded portion 1202 pushes the combination collet 1310 against the shoulder portion 1204 of the fitting body 120 such as to compress the ferrule 1312 against the outer surface 1106 of the flexible tube 110 and radially compress down against the first segments 1316 and the second segments 1326, causing the combination collet 1310 and the second collet 1320 to tightly grip the flexible tube 110, thereby improving leakage protection and preventing the flexible tube from sliding out of the sealing assembly arrangement 130.

The ferrule 1312, the first collet 1314, and the second collet 1320 together provide multiple areas of pressure grip on the flexible tube 110. This is highly desirable in high pressure applications, as maintaining sufficient depth and increasing the holding coverage is necessary for the assembly 100 to endure the forces due to high pressures. Further, use of the ferrule 1312, the first collet 1314 and the second collet 1320 is also highly desirable as it is a rather convenient and adjustable way of achieving the assembly 100 and is thus advantageous in field applications, where heavy pneumatic or hydraulic machinery is not easily accessible or in production lines having strict schedules. Further, ferrules, collets and compression nuts involve relatively low manufacture costs and provide flexibility in applications of the present embodiment. Thus the sealing assembly arrangement 130 is also a cost effective manner of achieving the objective. According to an embodiment, the scope of the present would enable one of ordinary skill in the art to create a compression nut that accommodates additional collets to increase the number of clamping portions (i.e. pressure rings) that apply radial pressure against the flexible tube 110.

FIGS. 3A-3C illustrate a plurality of visual steps for assembling the flexible tube 110 and the fitting body 120, in accordance with an embodiment of the present disclosure. As illustrated in FIG. 3A (step 310), the sealing assembly arrangement 130 including the combination collet 1310, the second collet 1320 and the compression nut 1330, is introduced to the outer flexible tube surface 1106 of the flexible tube 110 which has been slid coaxially over the guide tube portion 1206 of the fitting body 120. According to an embodiment, the sealing assembly arrangement 130 is introduced to the fitting body 120 such that first flexible tube end 1102 is received at the shoulder 1204 of the fitting body 120 such that at least a portion of the flexible tube 110 is inside the shoulder 1204 of the fitting body 120. The combination collet 1310 is moved along the outer flexible tube surface 1106 such that the flange portion 1313 will eventually abut the end of the shoulder 1204 of the fitting body 120. According to an embodiment, this positions the combination collet 1310 at a predetermined distance 'd' from the first flexible tube end 1102. The second collet 1320 is moved coaxially along the outer flexible tube surface 1106 such that the flange portion 1323 abuts the flared end (e.g. jaws 1318) of the clamping portion 1314 of the combination collet 1310. The compression nut 1330 is moved coaxially along the outer flexible tube surface 1106 such that a first tapering portion 1333 begins to radially press against an outer surface of the clamping portion 1315 of the combination collet 1310.

FIG. 3B illustrates step 320, in which the compression nut 1330 is further fastened coaxially over the threaded portion 1202 of the fitting body 120. According to an embodiment, the radial pressure from the first taper portion 1333 against the clamping portion 1315 of the combination collet 1310 causes the jaws 1318 of the clamping portion 1315 to bear down such that the inner diameter contracts and squeezes against the outer surface 1106 of the flexible tube 110. Although FIG. 3B shows a portion of the outer surface of the clamping portion 1315 of the combination collet 1310 overlapping the first taper portion 1333 of the compression nut 1330, it is understood that the clamping portion 1315 is actually being bent down from the radial pressure to press into the outer surface 1106 of the flexible tube 110.

FIG. 3C illustrates step 330, in which the compression nut 1330 is further fastened coaxially over the threaded portion 1202 of the fitting body 120 such that the assembly 100 of the flexible tube 110 and the fitting body 120 is obtained. According to an embodiment, the radial pressure from the second taper portion 1335 against the clamping portion 1325 of the second collet 1320 causes the jaws 1328 of the clamping portion 1325 to bear down such that the jaws 1328 squeezes against the outer surface 1106 of the flexible tube 110, and inner diameter contracts. Although FIG. 3C shows a portion of the outer surface of the clamping portion 1315 of the combination collet 1310 overlapping the first taper portion 1333 of the compression nut 1330 and the outer surface of the clamping portion 1325 of the second collet 1320 merely abutting the first second portion 1335, it should be understood that both of the clamping portions 1315 and 1325 are actually being bent down due to the radial pressure to each press into the outer surface 1106 of the flexible tube 110. Furthermore, although not shown in FIGS. 3A, 3B, and 3C, it is understood that at some point, as the compression nut is coaxially moved to further engage with the fitting body 120, the flange portion 1313 will eventually abut the shoulder 1204 of the fitting body 120, and the later pressure against the tapered portion of the ferrule 1312 that flares out will cause end of the ferrule 1312 to grip onto the outer surface 1106 of the flexible tube 110. The similar applies to FIG. 4.

Thus, the flexible tube 110 is fastened to the guide tube 1206 creating three pressure rings that grip the outer surface 1106 of the flexible tube 110: at the ferrule 1312, at the first collet 1314 and at the second collet 1320. This kind of arrangement is highly resilient to stresses caused due to supply of fluids or under high pressure through the assembly 100 by creating multiple pressure points that hold the flexible tube 110. According to an embodiment, pressure points may be created and compressed simultaneously or successively.

In an embodiment, as the compression nut 1330 is fastened, the pressure points are created and compressed in steps. As the compression nut 1330 is fastened on to the fitting body 1200, the flange portion 1313 abuts the inner surface of compression nut 1330, creating the first pressure point. Thereafter, the second collet 1320 abuts the inner surface of compression nut 1330 creating the second pressure point. As the compression nut 1330 is fastened further, the ferrule 1312 of the combination collet 1310 is pushed into the shoulder 1204 of the fitting body 120 and is interlocked with the fitting body 120. When the compression nut 1330 is completely fastened, three pressure points are created, a pressure point between the ferrule 1312 and the fitting body 120, a pressure point between the first collet 1314 and the second collet 1320, and the pressure point between the second collet 1320 and the compression nut 1330.

In another embodiment, more than two collets are used to create a larger portion of compression area.

Figure 4:
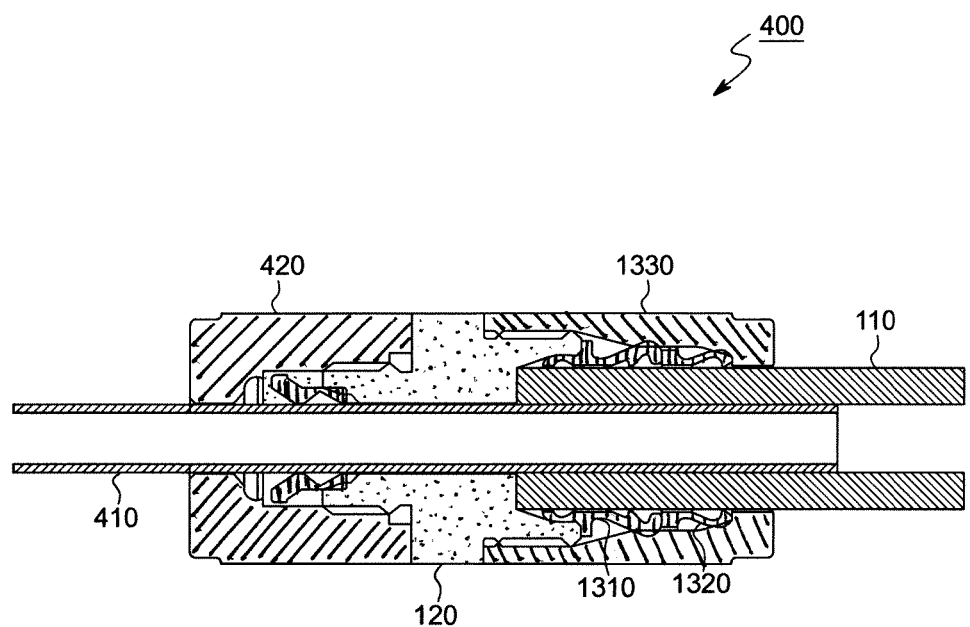
FIG. 4 illustrates an assembly of a flexible tube and another rigid tube, in accordance with an embodiment of the present disclosure.

FIG. 4 illustrates an assembly 400 of the flexible tube 110 and another rigid tube 410, in accordance with an embodiment of the present disclosure. In this embodiment, the fitting body 120 does not comprise the guide tube 1206. Instead, the fitting body 120 allows the other rigid tube 410 to penetrate through the fitting body 120. In one embodiment of the disclosure, the other rigid tube 410 may be a metallic tube or may be made up of a rigid polymeric material. The other rigid tube 410 may be assembled with the fitting body 120 at an opposite end of the flexible body 120, using another tube connector arrangement 420. In this embodiment, the sealing assembly arrangement 130, including the combination collet 1310, the second collet 1320 and the compression nut 1330 is adapted to securely adjoin the flexible tube 110 with the other rigid tube 410. This proves that the sealing assembly arrangement 130 can be used with a number of end connectors and/or with other flexible or rigid tubes.

Figure 5:
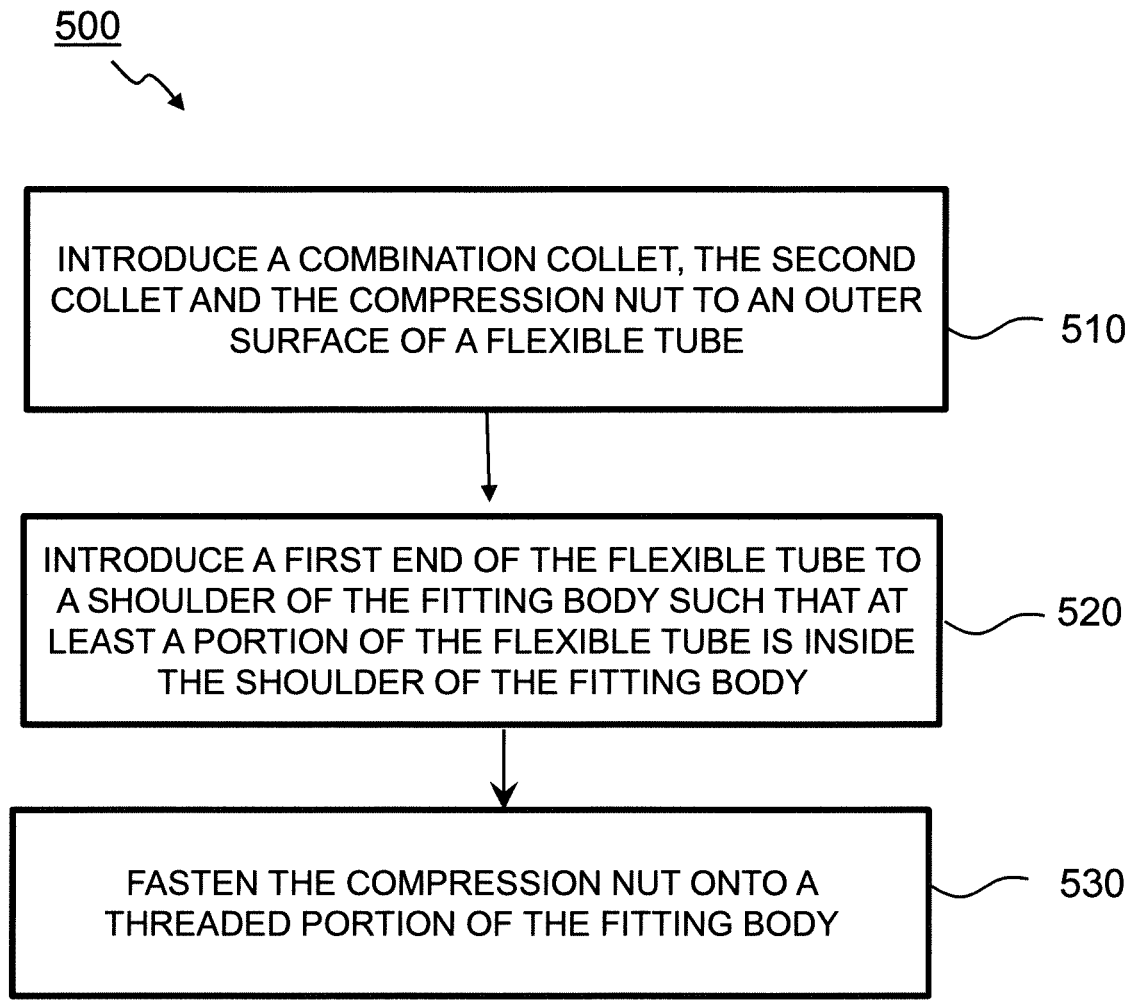
FIG. 5 illustrates a method for assembling a flexible tube and a fitting body, in accordance with an embodiment of the present disclosure.

FIG. 5 illustrates a method 500 for assembling the flexible tube 110 and the fitting body 120, in accordance with an embodiment of the present disclosure. At step 510, the sealing assembly arrangement 130 including the combination collet 1310, the second collet 1320 and the compression nut 1330, is introduced to the outer flexible tube surface 1106. The sealing assembly arrangement 130 is introduced through the first flexible tube end 1102.

At step 520, a first end of the flexible tube 110 is introduced to the shoulder 1204 of the fitting body 120 such that at least a portion of the flexible tube 110 is inside the shoulder 1204 of the fitting body 120. This combination collet 1310 is moved along the outer flexible tube surface 1106 to abut the fitting body 120, and the second collet is moved along the outer flexible tube surface 1106 to abut the combination collet. According to an embodiment steps 510 and 520 may be switched such that the flexible tube 110 is first introduced to the guide tube portion 1206 of the fitting body 120 before the combination collet 1310, second collet 1320, and the compression nut 1330 are introduced to the flexible tube 110.

At step 530, the compression nut 1330 is fastened onto the threaded portion 1202 of the fitting body 120. Thus, the assembly 100 of the flexible tube 110 and the fitting body 120 is obtained. In one embodiment of the disclosure, the fitting body 120 includes the guide tube 1206 and the flexible tube 110 is fastened to the guide tube 1206. In another embodiment of the disclosure, the fitting body does not include the guide tube 1206, and the flexible tube 110 is fastened to the other rigid tube 410. Thus, the flexible tube 110 is fastened to the guide tube 1206 or the other rigid tube 410 at three locations, the ferrule 1312, the first collet 1314 and the second collet 1320.

The embodiments of the disclosure discussed above offer a number of advantages. First, the use of collets and ferrule allows tight-gripped, leak-proof assembly that is flexible in arrangement. Further, the ferrule, the first collet and the second collet provide three gripping zones on the outer surface of the flexible tube, allowing the flexible tube to be adjoined with another tube in high pressure applications. The disclosure is convenient to use and can be applied to field applications or production lines with relative ease.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the disclosure is anticipated to hold on to all other such alternatives, modifications, and variations that fall within the scope of the present disclosure and appended claim.

I claim:

1. An apparatus for joining a rigid tube and a flexible tube, the apparatus comprising:
a fitting body comprising:
a shoulder portion extending out, the shoulder portion comprising a cavity and a threaded portion on an outer surface, and
the guide tube extending from the fitting body through the cavity in the same direction as the threaded portion, the guide tube for engaging with the flexible tube;
a sealing assembly arrangement coaxially over the flexible tube and engaged with the fitting body, the sealing assembly arrangement configured to clamp down against the outer surface of the flexible tube at multiple locations due to radial pressure, the sealing assembly comprising a compression nut comprising an inner threaded portion configured to engage with the threaded portion of the fitting body, a first taper portion for reducing an inner diameter of the compression nut, and a second taper portion at a lateral distance from the first taper portion for further reducing the inner diameter of the compression nut;
a ferrule configured to engage with the shoulder of the fitting body and clamp down at a first location of the outer surface of the flexible tube due to radial pressure caused by the compression nut being moved toward the fitting body;
a first collet configured to clamp down at a second location of the outer surface of the flexible tube due to radial pressure caused by the compression nut being moved toward the fitting body, the ferrule and the first collet forming a combination collet; and
a second collet configured to clamp down at a third location on the outer surface of the flexible tube due to radial pressure caused by the compression nut being moved toward the fitting body.

2. The apparatus of claim 1, wherein the combination collet is a monolithic structure.

3. The apparatus of claim 1, wherein:
the ferrule is configured to clamp down at the first location of the outer surface of the flexible tube due to radial pressure between the ferrule and the shoulder of the fitting body caused by the compression nut being moved toward the fitting body, and
the first collet comprises a first clamping portion for engaging with the first taper portion such that the first clamping portion clamps down at the second location of the outer surface of the flexible tube due to radial pressure between the first taper portion and the first clamping portion caused by the compression nut being moved toward the fitting body.

4. The apparatus of claim 1, wherein the second collet comprises a second clamping portion for engaging with the second taper portion such that the second clamping portion clamps down at the third location on the outer surface of the flexible tube due to radial pressure between the second taper portion and the second clamping portion caused by the compression nut being moved toward the fitting body.

5. The apparatus of claim 1, wherein the guide tube comprises a rigid tube that is coaxially positioned through the fitting body such that a first end of the rigid tube extends from one side of the fitting body and a second end of the rigid tube extends from the opposite side of the fitting body.

6. A method comprising:
introducing a ferrule, a first collet, a second collet, and a compression nut to an outer surface of a flexible tube, the ferrule and the first collet forming a combination collet, the compression nut comprising an inner threaded portion, a first inner taper portion, and a second inner taper portion;
sliding a first end of the flexible tube over a guide tube of a fitting body toward a shoulder of the fitting body such that at least a portion of the flexible tube is inside the shoulder of the fitting body; and
fastening the inner threaded portion of the compression nut onto an outer threaded portion on the shoulder of the fitting body such that a plurality of radial pressure caused by the first inner taper portion and the second inner taper portion of the compression nut causes the ferrule to clamp down at a first location of the outer surface of the flexible tube, the first collet to clamp down at a second location of the outer surface of the flexible tube, and the second collet to clamp down on a third location on the outer surface of the flexible tube.

7. The method of claim 6, wherein fastening the inner threaded portion of the compression nut onto the outer threaded portion of the shoulder of the fitting body generates a first radial pressure from the first inner taper portion of an inner wall of the compression nut, causing the first collet of the combination collet to clamp down at the second location on the outer surface of the flexible tube.

8. The method of claim 7, wherein fastening the inner threaded portion of the compression nut onto the outer threaded portion of the shoulder of the fitting body further generates a second radial pressure from the second inner taper portion of the compression nut, causing the second collet to clamp down at the third location on the outer surface of the flexible tube, the third location at a lateral distance from the second location.

9. The method of claim 8, wherein fastening the inner threaded portion of the compression nut onto the outer threaded portion of the shoulder of the fitting body further generates a third radial pressure from a taper portion on an inner wall of the shoulder of the fitting body, causing the ferrule of the combination collet to clamp down at the first location on the outer surface of the flexible tube, the first location being inside the shoulder of the fitting body.

10. The method of claim 8, wherein the second radial pressure is generated before the third radial pressure is generated.

11. The method of claim 8, wherein the second radial pressure and the third radial pressure are generated concurrently.

12. The method of claim 8, wherein the combination collet is a monolithic structure.

* * * * *